United States Patent
Byun

(10) Patent No.: US 11,962,951 B2
(45) Date of Patent: Apr. 16, 2024

(54) IMAGE SIGNAL PROCESSOR, METHOD OF OPERATING THE IMAGE SIGNAL PROCESSOR AND IMAGE PROCESSING SYSTEM INCLUDING THE IMAGE SIGNAL PROCESSOR

(71) Applicant: Samsung Electronics Co., Ltd., Suwon-si (KR)

(72) Inventor: Jeong-Moon Byun, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 200 days.

(21) Appl. No.: 17/521,275

(22) Filed: Nov. 8, 2021

(65) Prior Publication Data

US 2022/0353482 A1 Nov. 3, 2022

(30) Foreign Application Priority Data

Apr. 30, 2021 (KR) .................. 10-2021-0056354

(51) Int. Cl.
*H04N 9/76* (2006.01)
*G06T 9/00* (2006.01)

(52) U.S. Cl.
CPC .......... *H04N 9/76* (2013.01); *G06T 9/00* (2013.01)

(58) Field of Classification Search
CPC .................................... H04N 9/76; G06T 9/00
See application file for complete search history.

(56) References Cited

U.S. PATENT DOCUMENTS

| | | |
|---|---|---|
| 6,208,354 B1 | 3/2001 | Porter |
| 6,646,686 B1 | 11/2003 | Gryskiewicz et al. |
| 8,497,881 B2 | 7/2013 | Roh et al. |
| 8,655,086 B1 | 2/2014 | Christensen et al. |
| 8,698,838 B1 | 4/2014 | Masterson |
| 9,355,493 B2 | 5/2016 | Wong |
| 2006/0044320 A1* | 3/2006 | Jeong ............... H04N 21/42653 345/581 |
| 2017/0025098 A1* | 1/2017 | Keramidas ............. G09G 5/395 |

FOREIGN PATENT DOCUMENTS

KR 101551915 B1 9/2015
KR 20160026005 A 3/2016

* cited by examiner

*Primary Examiner* — Sing-Wai Wu
(74) *Attorney, Agent, or Firm* — Muir Patent Law, PLLC

(57) ABSTRACT

An image signal processor includes a first encoder receiving first image data for pixel data in a graphic image and performing compression on the first image data to generate first compressed data, an alpha map scaler extracting an alpha value α of the graphic image from the first image data and generating an alpha map for the alpha value α and a second encoder receiving the alpha map and second image data for pixel data in a video image, performing computation on the second image data using the alpha map to generate multiply data and performing compression on the multiply data to generate second compressed data.

20 Claims, 18 Drawing Sheets

IMAGE SIGNAL PROCESSOR, METHOD OF OPERATING THE IMAGE SIGNAL PROCESSOR AND IMAGE PROCESSING SYSTEM INCLUDING THE IMAGE SIGNAL PROCESSOR

CROSS-REFERENCE TO RELATED APPLICATION

This application claims priority from Korean Patent Application No. 10-2021-0056354 filed on Apr. 30, 2021 in the Korean Intellectual Property Office and all the benefits accruing therefrom under 35 U.S.C. 119, the contents of which in its entirety are herein incorporated by reference.

BACKGROUND

Technical Field

The present disclosure relates to an image signal processor, a method of operating the image signal processor, and an image processing system including the image signal processor.

Description of the Related Art

With the needs for a video high-resolution image and a high-frame rate image, a bandwidth between various multimedia Intellectual Properties (IP) of an image processing system and a memory has been greatly increased.

When the bandwidth is increased, the processing capability of the image processing system reaches a limit, whereby a problem may occur in that a speed of the image processing system is reduced during recording and playing operations of a video image.

Therefore, when multimedia IP including an image processing system accesses a memory, a method of compressing a size of data is considered. For example, before writing data in a memory, data may be compressed, and the compressed data may be decompressed before reading the data in the memory.

SUMMARY

An object of the present disclosure is to provide an image signal processor that performs optimized image data compression.

Another object of the present disclosure is to provide a method of operating an image signal processor to perform optimized image data compression.

Still another object of the present disclosure is to provide a display device that performs optimized image data compression.

Further still another object of the present disclosure is to provide an image signal processor with improved power efficiency.

The objects of the present disclosure are not limited to those mentioned above and additional objects of the present disclosure, which are not mentioned herein, will be clearly understood by those skilled in the art from the following description of the present disclosure.

According to some embodiments of the present disclosure devised to achieve the above objects, there is provided an image signal processor comprising a first encoder receiving first image data for pixel data in a graphic image and performing compression for the first image data to generate first compressed data, an alpha map scaler extracting an alpha value $\alpha$ of the graphic image from the first image data and generating an alpha map for the alpha value $\alpha$ and a second encoder receiving the alpha map and second image data for pixel data in a video image, performing computation on the second image data using the alpha map to generate multiply data and performing compression on the multiply data to generate second compressed data.

According to some embodiments of the present disclosure devised to achieve the above objects, there is provided an image processing system comprising an image signal processor processing first image data for pixel data in a graphic image and second image data for pixel data in a video image to generate an output image, a memory receiving first compressed data for the first image data, second compressed data for the second image data and the output image and a display displaying the output image, wherein the image signal processor includes a first encoder receiving the first image data and performing compression for the first image data to generate the first compressed data, an alpha map scaler extracting an alpha value $\alpha$ of the graphic image from the first image data and generating an alpha map for the alpha value $\alpha$ and a second encoder receiving the alpha map and the second image data, performing computation on the second image data in the alpha map to generate multiply data and performing compression on the multiply data to generate second compressed data.

According to some embodiments of the present disclosure devised to achieve the above objects, there is provided a method of operating an image signal processor, the method comprising receiving first image data for pixel data in a graphic image, extracting an alpha value $\alpha$ of the graphic image from the first image data and generating an alpha map for the alpha value $\alpha$, receiving the alpha map and second image data for pixel data in a video image, performing computation on the second image data using the alpha map to generate multiply data, performing compression on the multiply data to generate second compressed data and performing compression on the first image data to generate first compressed data and performing alpha-bending by performing mixing the first compressed data and the second compressed data.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE DISCLOSURE

Figure 1:
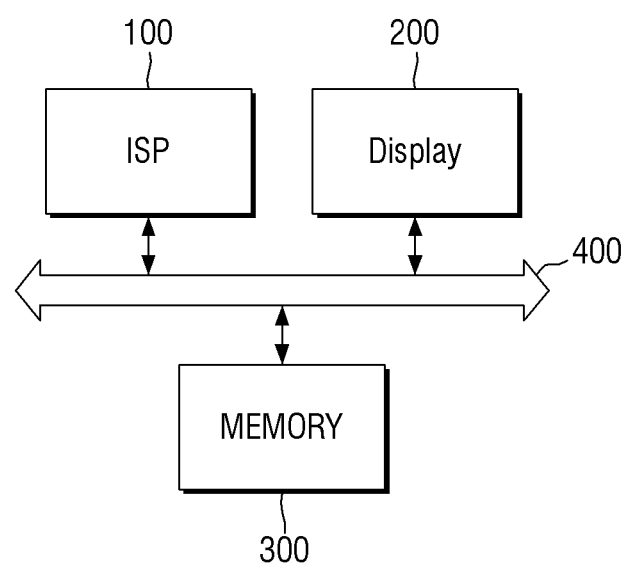
FIG. 1 is a view illustrating an image processing system according to some embodiments of the present disclosure.
Figure 2:
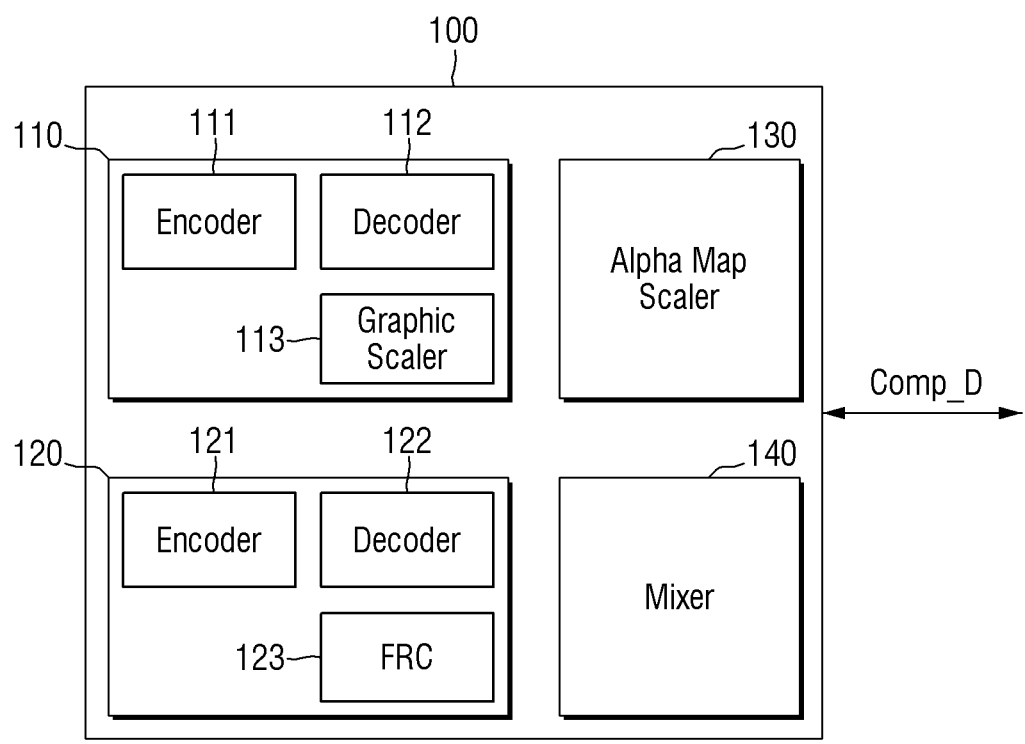
FIGS. 2 to 8 are views illustrating an image signal processor according to some embodiments of the present disclosure.
Figure 3:
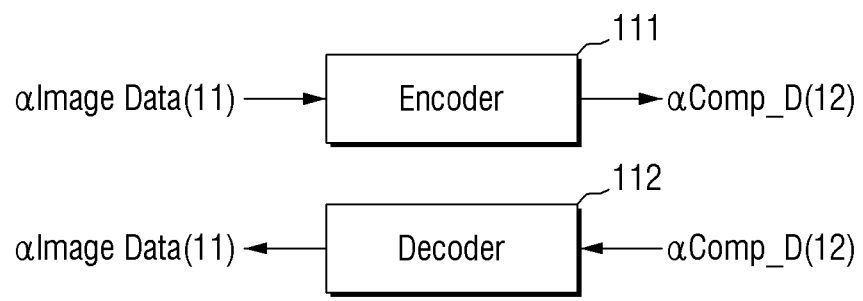
Figure 4:
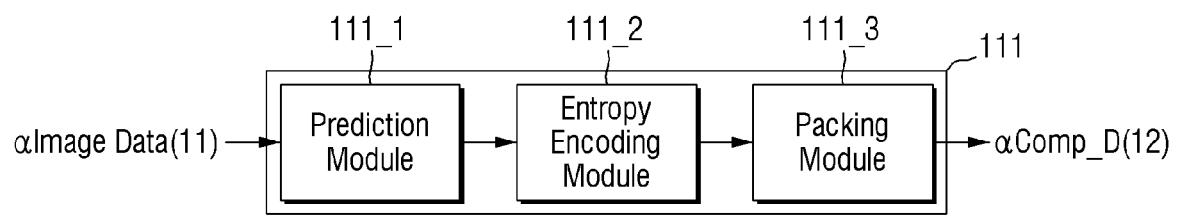
Figure 5:
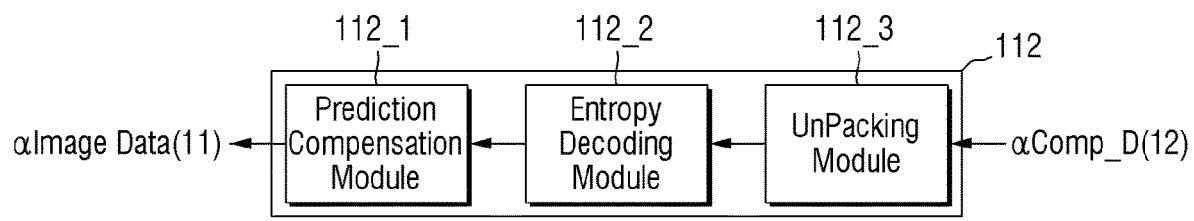
Figure 6:
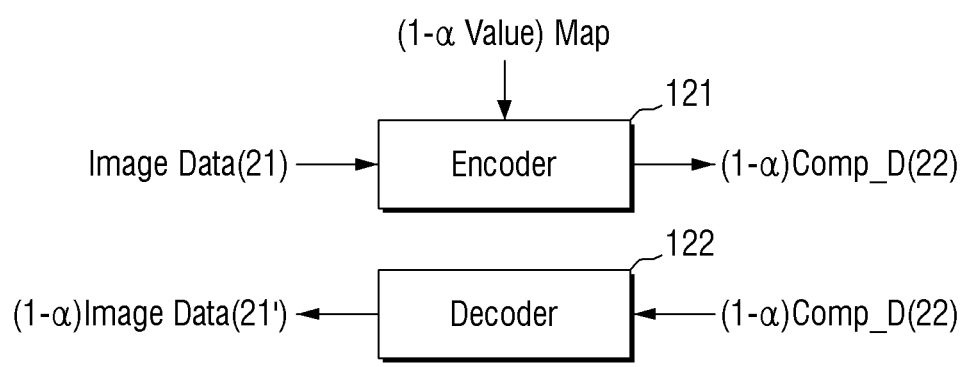
Figure 7:
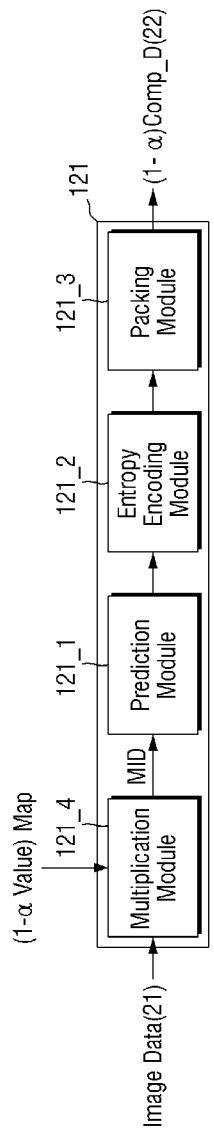
Figure 8:
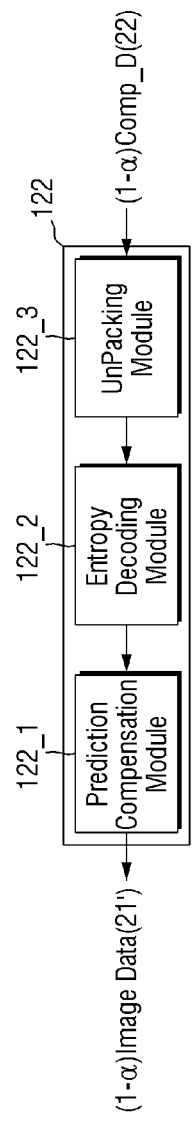

Hereinafter, the embodiments according to technical spirits of the present disclosure will be described with reference to the accompanying drawings. In description of FIGS. 1 to 18, the same reference numerals are used for the substantially same elements, and a repeated description of the corresponding elements will be omitted. Also, similar reference numerals are used for similar elements throughout the drawings of the present disclosure.

FIG. 1 is a view illustrating an image processing system according to some embodiments of the present disclosure.

Referring to FIG. 1, an image processing system 1 includes an image signal processor 100, a display 200, a memory 300 and a system bus 400.

The image processing system 1 is an image processing device, and may include a personal computer (PC) capable of displaying image data, a portable computer, a digital camera, a personal digital assistant (PDA), a cellular telephone, an MP3 player, a portable multimedia player (PMP), an automotive navigation system, and the like, but the scope of the present disclosure is not limited thereto.

The image signal processor 100 performs alpha-blending for video image data and graphic image data to generate and output synthesized image data.

The image signal processor 100 may perform alpha-blending for a video image and a plurality of graphic images based on an alpha value α corresponding to at least one of the plurality of graphic images to acquire an output image. In this case, alpha-blending means a method for mixing and displaying a background RGB value and an RGB value thereon (i.e., a foreground RGB value) by allocating a new value such as an alpha value α to a color value RGB so as to obtain a transparent effect when an image is overlapped on another image. For example, the alpha value α is divided into values of 0 to 255 or values of 0.0 to 1.0, where 0 may mean "completely transparent" and 255 (or highest value such as 1.0) opposite to 0 may mean "fully opaque". In some embodiments, 0 may mean "fully opaque", and 255 (or highest value such as 1.0) opposite to 0 may mean "completely transparent". For example, when 8 bits are allocated to represent the alpha value and thus values from 0 to 255 may be expressed, the greater the alpha value is, the higher a ratio of a corresponding pixel, which is multiplied with the alpha value, may be, and the lower the alpha value is, the lower the ratio of the corresponding pixel, which is multiplied with the alpha value, may be. According to an example, when image data V for a video and image data G for a graphic are mixed with each other, the mixing operation may be expressed as V*alpha value α+G*(1−alpha value α).

In the above output process, the image signal processor 100 pre-processes and converts the input video image data and graphic image data, performs a compression operation for the pre-processed image data and then receives the compressed data to perform decompression.

Although not shown, the image signal processor 100 performs a conversion to equalize a format of the video image data and a format of the graphic image data. For example, YUV format data may be converted into RGB format data.

The YUV format means a data format for splitting and expressing a luminance signal and a chrominance signal. For example, Y means a luminance signal, and U(Cb) and V(Cr) mean chrominance signals. U denotes a difference between the luminance signal and a blue signal component, and V denotes a difference between the luminance signal and a red signal component.

The RGB format data refers to a data format expressing a color based on three primary colors of light. For example, the RGB format data refers to a data format expressing an image using three colors of red, green and blue. This RGB format data may be obtained by being converted from the YUV format data using a conversion equation such as, for example, R=1.164(Y−16)+1.596(V−128), G=1.164(Y−16)−0.813 (V−128)−0.391(U−128), and B=1.164(Y−16)+2.018 (U−128).

The image signal processor 100 compresses the pre-processed image data before accessing the memory 300, and then performs decompression for the compressed data after accessing the memory 300. The image signal processor 100 stores the compressed data in the memory 300 and transmits the compressed data back to a multimedia IP including the display 200, and the multimedia IP including the display 200 may decompress the compressed data individually.

Although the multimedia IP may include a shaking correction module, a multi-format codec, a GPU, etc. in addition to the display 200, the multimedia IP may individually access the memory 300 with a processing module that accesses the memory 300 to process images such as video, graphic and the like, thereby writing or reading data.

Therefore, the display 200 may display data stored by individually accessing the memory 300, on a screen. The display 200 may display image data processed by the image signal processor 100 on the screen. For example, the display 200 may display data on an output image output from the image signal processor 100, but the present embodiment is not limited thereto.

The memory 300 may store the compressed data. The compressed data stored in the memory 300 may be loaded by the multimedia IP, and the loaded data may be transmitted to the image signal processor 100 or the multimedia IP.

The system bus 400 may be connected with the image signal processor 100, the display 200, and the memory 300. For example, the image signal processor 100 and the display 200 may individually be connected to the system bus 400. Although not shown, the multimedia IP may also be individually connected to the system bus 400. The system bus 400 may be a path through which the image signal processor 100, the display 200 and the memory 300 transmit data to one another.

FIGS. 2 to 8 are views illustrating an image signal processor according to some embodiments of the present disclosure.

Referring to FIGS. 2 to 8, the image signal processor 100 outputs compressed data Comp_D and provides the same to the memory 300 of FIG. 1. The image signal processor 100 may include a graphic IP 110, a video IP 120, an alpha map scaler 130, and a mixer 140.

The graphic IP 110 may compute and generate a two-dimensional or three-dimensional graphic image, and performs a compression or decompression operation for the image data including information for each pixel in the graphic image.

The graphic IP 110 includes a graphic encoder 111, a graphic decoder 112, and a graphic scaler 113.

The graphic encoder 111 may perform a compression operation for graphic image data 11 computed for the alpha value α to generate compressed graphic data 12 and transmit the compressed graphic data 12 to the memory 300 through the system bus 400. In some embodiments, the graphic encoder 111 may perform a compression operation on graphic image data 11 computed with the alpha value α (e.g., multiplied by the alpha value α) to generate compressed graphic data 12 and transmit the compressed graphic data 12 to the memory 300 through the system bus 400. In accordance with an embodiment, the graphic image data 11 may be provided to the encoder 111 in units of pixels or blocks constituting a graphic image.

The graphic decoder 112 may perform a decompression operation for the compressed graphic data 12 input from the memory 300 through the system bus 400 to generate the graphic image data 11.

The graphic encoder 111 may include a graphic prediction module 111_1, a graphic entropy encoding module 111_2, and a graphic packing module 111_3.

The graphic prediction module 111_1 may convert the graphic image data 11 into residual data. The residual data may be expressed by being divided into data of a reference pixel and residual data of a pixel adjacent to the reference pixel. For example, when one pixel has values of 0 to 255, data of 8 bits per pixel may be used to express the values. When the adjacent pixels have similar values, such pixels may be represented using a difference between the adjacent pixels (i.e., the residual therebetween) without loss of data, and the number of data bits to expressed the pixels may be reduced significantly. For example, when pixels in which a reference pixel, a pixel P1 and a pixel P2 adjacent to the reference pixel have values of (96, 97, 98) are continuous, the reference pixel based on the data value of 96 is sufficient to express a residual data representation of (96 (reference), 1 (residual), 1 (residual)), and the number of bits per pixel for the residual data representation may be very small to 2 bits. In some embodiments, when a reference pixel and its adjacent pixels P1 and P2 are continuously arranged and have values of (96, 97, 98), the values may be expressed, using the reference value of the reference pixel, and residual values of the other pixels P1 and P2 with reference to the reference value, as follows: (96 (reference), 1 (residual), 1 (residual)). This representation of the pixel values for the pixels P1 and P2 using the residuals may reduce the number of bits per pixel to 2 bits.

The graphic prediction module 111_1 may compress a total size of the graphic image data 11 by expressing the residual data to be divided into data of the reference pixel and residual data of a pixel adjacent to the reference pixel. For example, the graphic prediction module 111_1 may express the graphic image data 11 using data of reference pixels and residual data of pixels adjacent to the reference pixels. The residual data may be generated based on the graphic image data 11 input to the graphic prediction module 111_1 and prediction data generated by the graphic prediction module 111_1, but various methods may be used as a method of generating prediction data in accordance with an embodiment.

The graphic prediction module 111_1 may perform prediction in units of pixels or perform prediction in units of blocks. In this case, the block may mean an area formed by a plurality of adjacent pixels.

The graphic entropy encoding module 111_2 may compress the residual data generated by the graphic prediction module 111_1 through entropy coding. The graphic entropy encoding module 111_2 may encode and compress some or all of the image data 10 for one pixel by a variable bit rate (VBR) or a constant bit rate (CBR). When encoding is performed in a variable bit rate scheme, the graphic entropy encoding module 111_2 outputs the number of bits that vary at every pixel. The graphic entropy encoding module 111_2 may perform encoding using Golomb Rice coding, exponential Golomb coding or Huffman coding. In some embodiments, the graphic image data 11 may be compressed in a Golomb Rice coding scheme. At this time, the graphic entropy encoding module 111_2 may generate an entropy table through a value of K, thereby simply compressing the graphic image data 11.

The entropy table refers to a plurality of code tables identified through the value of K to perform an entropy coding algorithm, and the entropy table that may be used in some embodiments of the present disclosure may include at least one of Golomb Rice code and exponential Golomb code. The concept of entropy coding algorithm, Golomb-Rice coding algorithm, exponential Golomb coding algorithm and the like is already known in the art and therefore a detailed description thereof will be omitted herein.

Although not shown, a quantization module may operate prior to the graphic entropy encoding module 111_2 when the graphic encoder 111 operates in a lossy mode in accordance with an embodiment. The lossy mode may have a relatively high compression rate compared to a lossless mode in which the quantization module does not operate, and may have a predetermined fixed compression rate, whereby information on the compression rate may not be required separately. However, a removal operation may be performed for some bits of the graphic image data 11 by the quantization module, whereby the corresponding bits may be lost without being restored later.

The packing module 111_3 may perform padding for the graphic image data 11 compressed by the graphic entropy encoding module 111_2, pack the data output from the encoder 111 and output the packed data as the compressed graphic data 12 in the form of a data stream. In this case, padding may mean adding meaningless data to conform to a particular size.

Afterwards, the image signal processor 100 may write the generated compressed graphic data 12 in the memory 300.

The graphic decoder 112 may include a graphic prediction compensation module 112_1, a graphic entropy decoding module 112_2 and a graphic unpacking module 112_3.

The graphic unpacking module 112_3 may remove the padded portion of the data padded by the packing module 111_3 of the graphic encoder 111.

The graphic entropy decoding module 112_2 may perform a decompression operation for the compressed graphic data 12 from which the padded portion is removed, in accordance with an encoding scheme performed by the graphic entropy encoding module 111_2.

When the graphic entropy encoding module 111_2 performs encoding with a variable bit rate (VBR), the graphic entropy decoding module 112_2 may perform decompression for the compressed graphic data 12 through a Golomb Rice coding scheme, an exponential Golomb coding scheme or a Huffman coding scheme. For example, when encoding is performed by the graphic entropy encoding module 111_2 in the Golomb Rice coding scheme, the graphic entropy decoding module 112_2 may decompress the compressed graphic data 12 in the Golomb Rice coding scheme. Since the compressed graphic data 12 includes a value of K, the entropy decoding module 112_2 may perform decoding using the value of K.

The graphic prediction compensation module 112_1 may restore data represented as the residual data by the graphic prediction module 111_1. The graphic prediction compensation module 112_1 may convert a residual data representation of (96 (reference), 1 (residual), 1 (residual)) into (96, 97, 98), for example.

The graphic prediction compensation module 112_1 may restore the prediction performed by the pixel unit or block unit in accordance with the graphic prediction module 111_1. Thus, the compressed graphic data 12 may be restored or decompressed to generate the graphic image data 11.

The graphic scaler 113 may receive the decompressed graphic image data to perform scaling for the graphic image to correspond to resolution of the video image, thereby generating output graphic data. For example, when resolution of the video image to be mixed in the mixer 140 is 8K and resolution of the received graphic image is 2K or 4K, the graphic image data may be up-scaled to a size of 8K.

The video IP 120 may compute a video and generate video image data, and performs a compression or decompression operation for the image data including information on each pixel in the video image.

The video IP 120 includes a video encoder 121, a video decoder 122, and a frame rate converter (FRC) 123.

The video encoder 121 may receive an alpha map M for the alpha value α from the alpha map scaler 130, which will be described later, receive the video image data 21, generate compressed video data 22 computed and processed with a value of (1−alpha value α) by performing a compression operation based on the alpha map M and the video image data 21 and transmit the compressed video data 22 to the memory 300 through the system bus 400. In accordance with an embodiment, the video image data 21 may be provided to the video encoder 121 in units of pixels or blocks constituting a video image.

The video decoder 122 may perform a decompression operation for the compressed video data 22 input from the memory 300 through the system bus 400 to generate decompressed video image data 21'. For example, the video decoder 122 may perform a decompression operation on the compressed video data 22 received from the memory 300 through the system bus 400 to generate decompressed video image data 21'. In some embodiments, the compressed video data 22 may be multiplied with the value of (1−alpha value α), and the decompressed video data 21' may also be multiplied with the value of (1−alpha value α).

The video encoder 121 and the video decoder 122 may respectively correspond to the graphic encoder 111 and the graphic decoder 112, and the video encoder 121 and the video decoder 122 will be described based on a difference between respective elements. It will be apparent that the description of the elements corresponding to the video encoder 121 and the video decoder 122 may be replaced by the description of the graphic encoder 111 and the graphic decoder 112.

The video encoder 121 may include a video prediction module 121_1, a video entropy encoding module 121_2, a video packing module 121_3, and a multiplication module 121_4.

The video prediction module 121_1, the video entropy encoding module 121_2 and the video packing module 121_3 correspond to (i.e., have the same or similar configuration with) the graphic prediction module 111_1, the graphic entropy encoding module 111_2 and the graphic packing module 111_3, respectively.

The multiplication module 121_4 receives the alpha map M and the video image data 21, and performs a multiply operation based on the received alpha map M and the received video image data 21 to generate multiply data MID.

For example, the video image data 21 may be converted to the multiply data MID by the multiplication of (1−alpha value α) map having 1 and a value of (1−alpha value α) to the video image data 21.

The alpha map M is scaled to correspond to resolution of the video image data 21, and may include 1 and a value of (1−alpha value α). The alpha map M has 1 and a value of (1−alpha value α) may also be referred to as a (1−alpha value α) map.

The video prediction module 121_1, the video entropy encoding module 121_2 and the video packing module 121_3 perform compression for the video image data 21 based on the multiply data MID to generate the compressed video data 22. In some embodiment, the video prediction module 121_1, the video entropy encoding module 121_2 and the video packing module 121_3 perform compression on the multiply data MID to generate the compressed video data 22.

The video decoder 122 may include a video prediction compensation module 122_1, a video entropy decoding module 122_2 and a video unpacking module 122_3.

The video prediction compensation module 122_1, the video entropy decoding module 122_2 and the video unpacking module 122_3 correspond to (i.e., have the same or similar configuration with) the video prediction module 112_1, the video entropy encoding module 112_2 and the video packing module 112_3, respectively.

The FRC 123 may receive the plurality of video image data, which are decompressed, and perform video processing for changing a frame rate by acquiring video image data interpolated between the plurality of video image data, thereby acquiring an output video image that is video output data.

The alpha map scaler 130 receives the graphic image data 11 from the graphic encoder 111 or receives the compressed graphic data 12 from the memory 300 to extract the alpha value α of the graphic image, performs scaling based on resolution of the video image data 21 to generate an alpha map M having 1 and a value of (1−alpha value α), and provides the alpha map M to the video encoder 121.

The mixer 140 performs alpha-blending by mixing the output video data to be output from the FRC 123 with the output graphic data scaled by the graphic scaler 113 to generate an output image, thereby outputting an output video.

Figure 9:
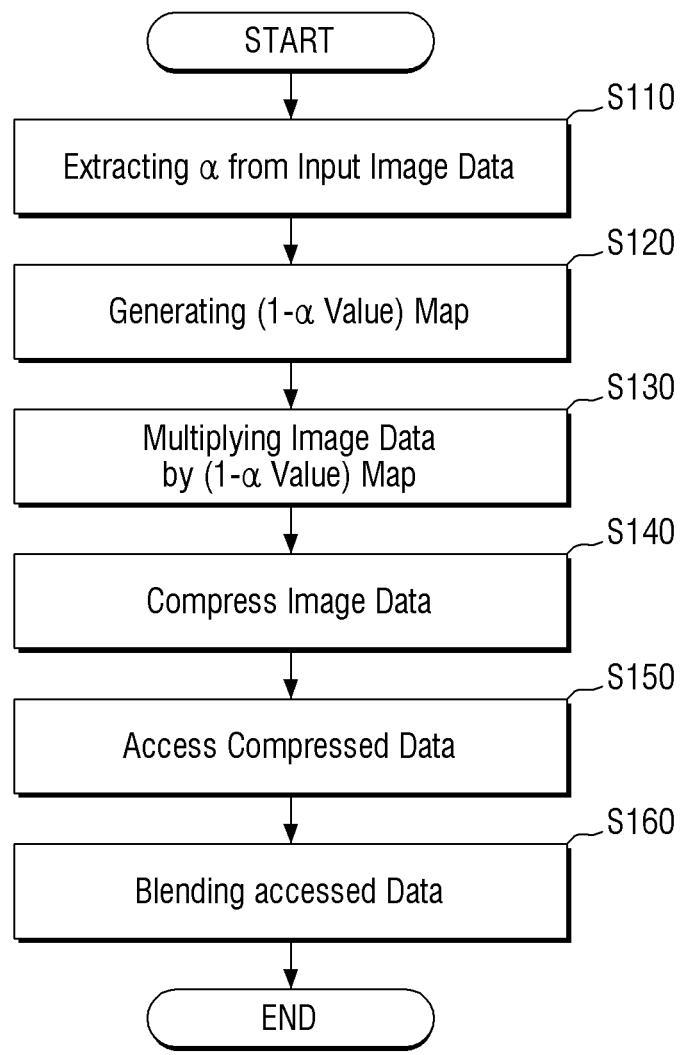
FIG. 9 is a flow chart illustrating an operation of an image processing system according to some embodiments of the present disclosure.

FIG. 9 is a flow chart illustrating an operation of an image processing system according to some embodiments of the present disclosure. FIGS. 10 to 13 are views illustrating an operation of an image processing system according to some embodiments of the present disclosure.

Figure 10:
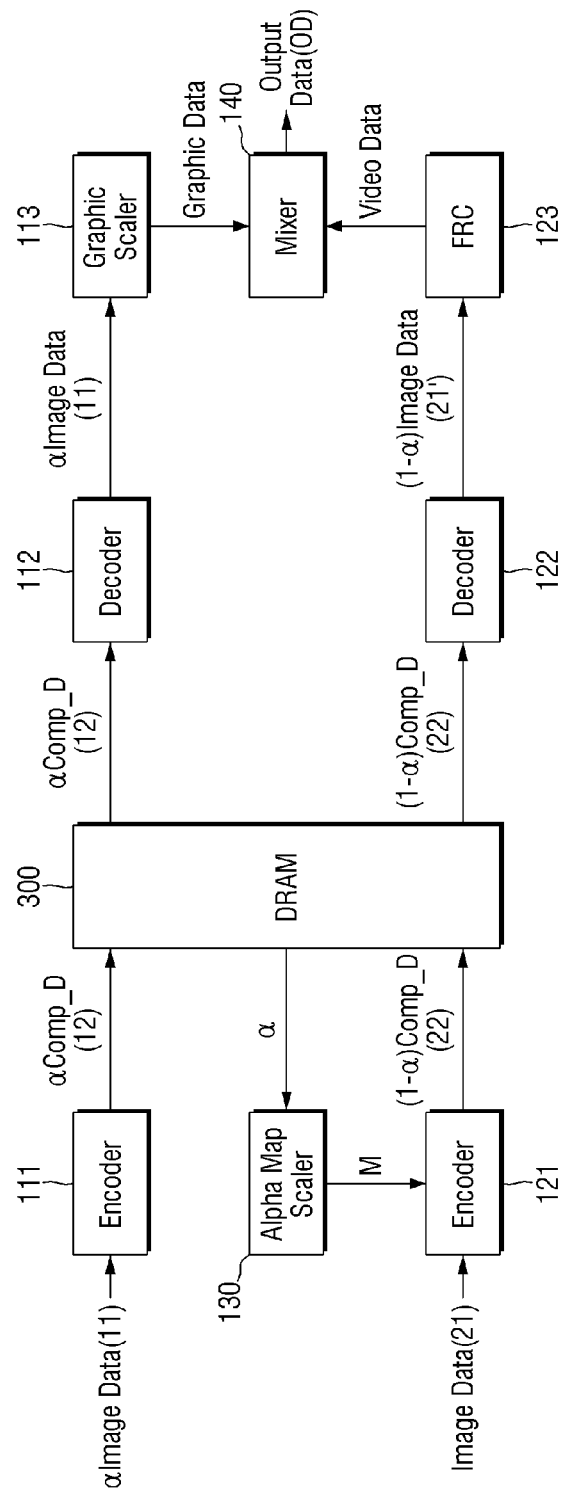
FIGS. 10 to 13 are views illustrating an operation of an image processing system according to some embodiments of the present disclosure.
Figure 11:
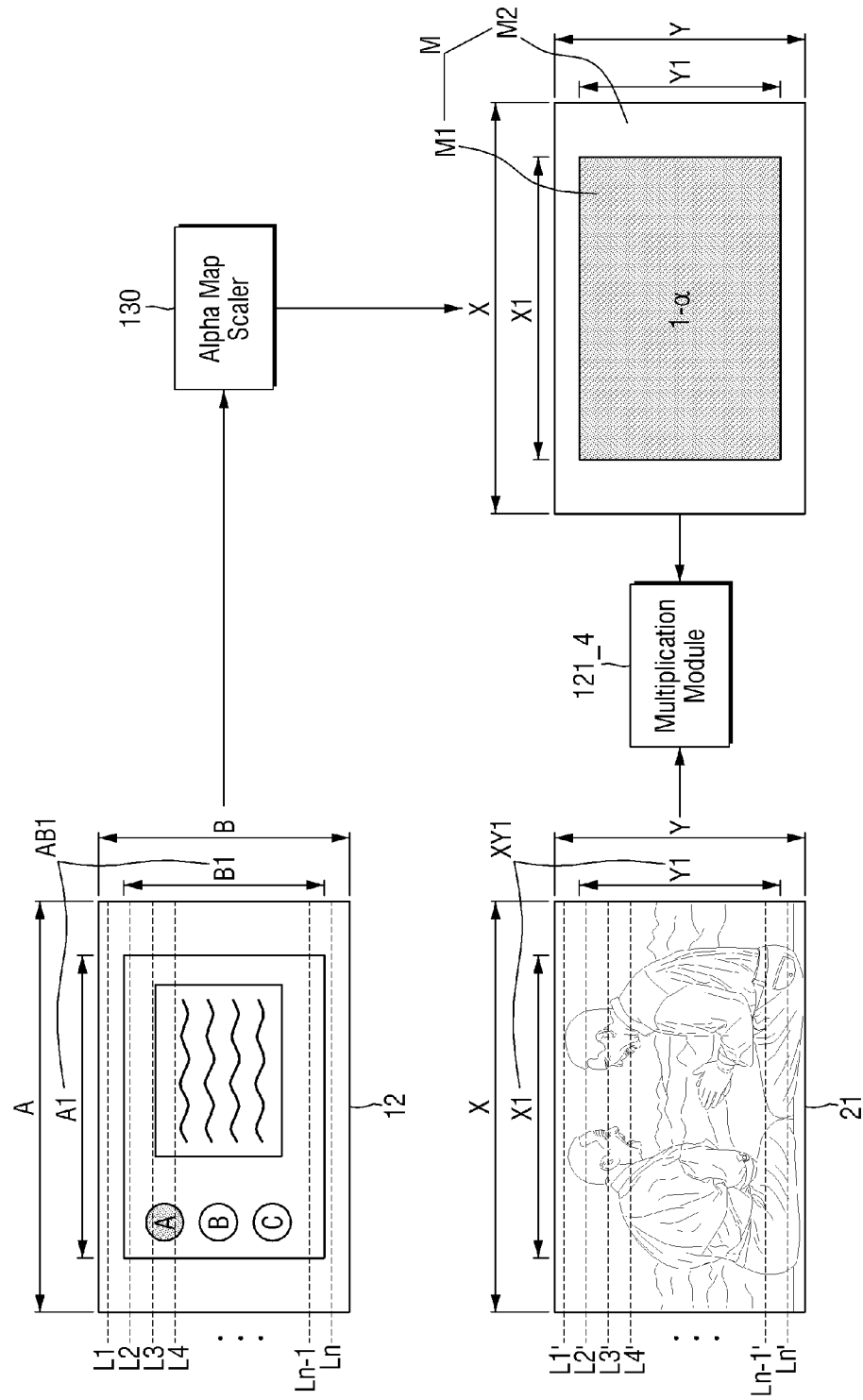

Referring to FIGS. 9, 10 and 11, the alpha map scaler 130 receives the compressed graphic data 12 from the memory 300 and extracts the alpha value α from the image data corresponding to an opaque area A1B1 of a graphic horizontal period A and a graphic vertical interval B in the compressed graphic data 12 (S110).

The graphic image data 11 corresponding to the compressed graphic data 12 includes first to nth graphic image data L1 to Ln corresponding to each horizontal line of the graphic vertical period B. The second to (n−1)th graphic image data L2 to Ln−1 overlapped with the opaque area A1B1 are computed (e.g., multiplied) by the alpha value α and the first graphic image data L1 and the nth graphic image data Ln, which are overlapped with the opaque area A1B1, are computed (e.g., multiplied) by 0.

The alpha map scaler 130 extracts the alpha value α based on the compressed graphic data 12 corresponding to the second to (n−1)th graphic image data L2 to Ln−1. In some embodiments, the alpha map scaler 130 may assign the alpha value α to each pixel of the graphic image data 11 (or the compressed graphic data 12), and multiply the alpha value α to the graphic image data 11 (or the compressed graphic data 12). The alpha value α may be greater than zero for the pixels corresponding to the second to (n−1)th graphic image data L2 to Ln−1, and the alpha value α may be zero for the pixels corresponding to the other region.

The alpha map scaler 130 performs scaling in consideration of a video horizontal period X, a video vertical period Y and an overlap area X1Y1 to generate the alpha map M (S120). In some embodiments, such scaling operation may be performed on the compressed graphic data 12 such that the graphic image data 11 and the video image data 21 may have the same horizontal width and vertical height as each other.

The alpha map M includes a first area M1 and a second area M2. The first area M1 corresponding to the overlap area X1Y1 of the video image data 21 has (1−alpha value α), and the second area M2 corresponding to the other area except the overlap area X1Y1 has a value of 1. The overlap area X1Y1 corresponds to the opaque area A1B1 of the graphic image data 11.

The multiplication module 121_4 receives the alpha map M and the video image data 21, and performs a multiply operation based on the received alpha map M and the received video image data 21 to generate multiply data MID (S130). For example, in the multiply operation, the alpha map M or the (1−alpha value α) map may be multiplied to the video image data 21, thereby generating the multiply data MID.

The video image data 21 includes first to nth video image data L1' to Ln' corresponding to each horizontal line in the video vertical period Y. The first to nth video image data L1' to Ln' respectively correspond to the first to nth graphic image data L1 to Ln.

The second to (n−1)th video image data L2' to Ln−1' overlapped with the overlap area X1Y1 are multiplied by the value of (1−alpha value α) of the alpha map M or by the first area M1 of the alpha map M, and the first and nth video image data L1' and Ln' are multiplied by a value of 1 by the first area M1 of the alpha map M.

Figure 12:
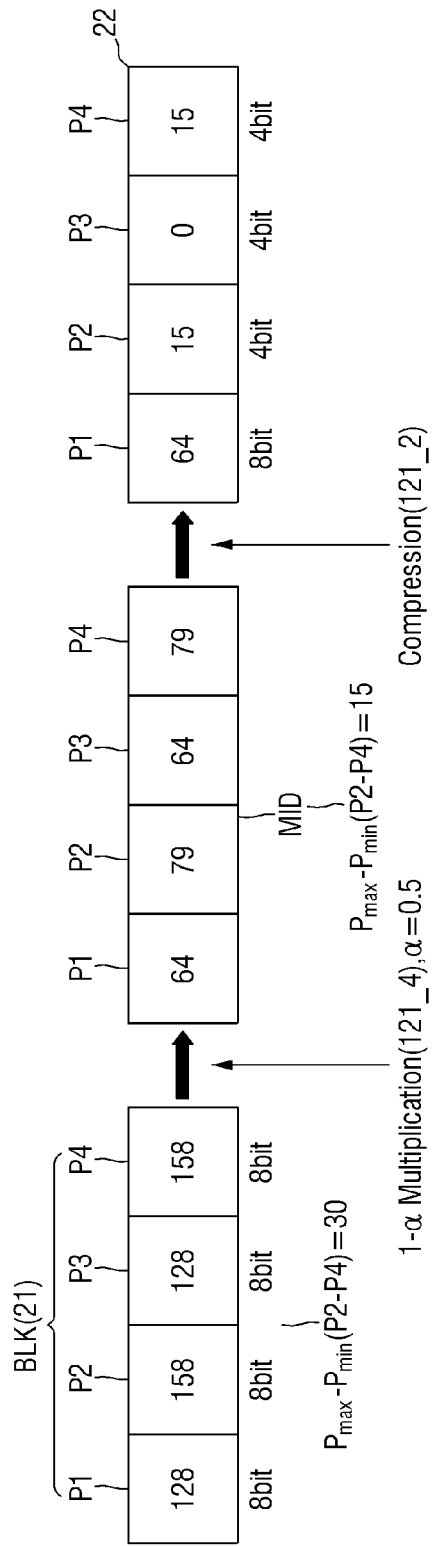

Referring to FIG. 12, a block BLK included in the second to (n−1)th video image data L2' to Ln−1' includes first to fourth pixels P1 to P4. Each of the first to fourth pixels P1 to P4 includes image data allocated to 8 bits, and the first to fourth pixels P1 to P4 have 128, 158, 128 and 158, respectively. For example, each pixel may have a pixel value (e.g., an intensity) among 0 to 255. The first pixel P1 is performed as a reference pixel during compression and decompression operations, and a maximum value of a difference among pixels in the video image data is 30.

The multiplication module 121_4 performs computation processing for the block BLK to 0.5 that is the 1−alpha value α, and the first to fourth pixels P1 to P4 in the multiply data MID have 64, 79, 64 and 79, and a maximum value of a difference in the multiply data between the pixels is 15. For the convenience of description, an alpha value α is assumed to be 0.5. The multiplication module 121_4 may multiply a value of (1−an alpha value α of 0.5) with each pixel of the block BLK to generate the multiply data MID. The pixel values of the first to fourth pixels P1 to P4 in the multiply data are 64, 79, 64 and 79. At the multiply data MID, the maximum difference among pixels P1 to P4 is 15 lower than 30 at the video image data.

The graphic encoder 111 compresses the graphic image data 11 to generate the compressed graphic data 12, and the video encoder 121 compresses the video image data 21 based on the multiply data MID to generate the compressed video data 22 (S140).

After the access operation, the compressed graphic data 12 and the compressed video data 22 are respectively provided to the graphic encoder 112 and the video encoder 122 and then decompressed.

Since the maximum value of the difference in data between the pixels is 15, 4 bits are allocated to the compressed data of the second to fourth pixels P2 to P4. Although described as being compressed in a fixed bit rate scheme for convenience of description, the technical spirits of the present disclosure are not limited thereto.

The memory 300 is provided with the compressed graphic data 12 and the compressed video data 22. A graphic decoder 112 and a video decoder 122 may access the memory 300 to read the compressed graphic data 12 and the compressed video data 22 (S150).

After the access operation, the compressed graphic data 12 and the compressed video data 22 are respectively provided to the graphic encoder 111 and the video encoder 121 and then decompressed.

The decompressed graphic image data 11 and the decompressed video image data 21' are provided to the graphic scaler 113 and the FRC 123 and converted into output graphic data and output video data.

The mixer 140 mixes the output graphic data with the output video data to generate output data OD that is an output image (S160). In some embodiment, the output graphic data may correspond to the graphic image data multiplied with the alpha map M having zero and an alpha value α, and the output video data may correspond to the video image data multiplied with the (1−alpha value α) map having 1 and the value of (1−alpha value α).

Figure 13:
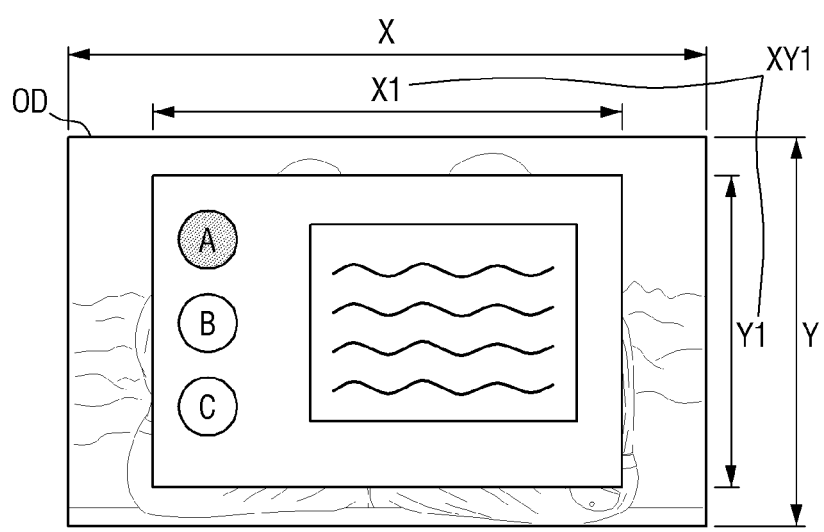

Referring to FIG. 13, a graphic image corresponding to the opaque area A1B1 in the graphic image data 11 of FIG. 11 is disposed in the overlap area X1Y1 of the output data OD.

Figure 14:
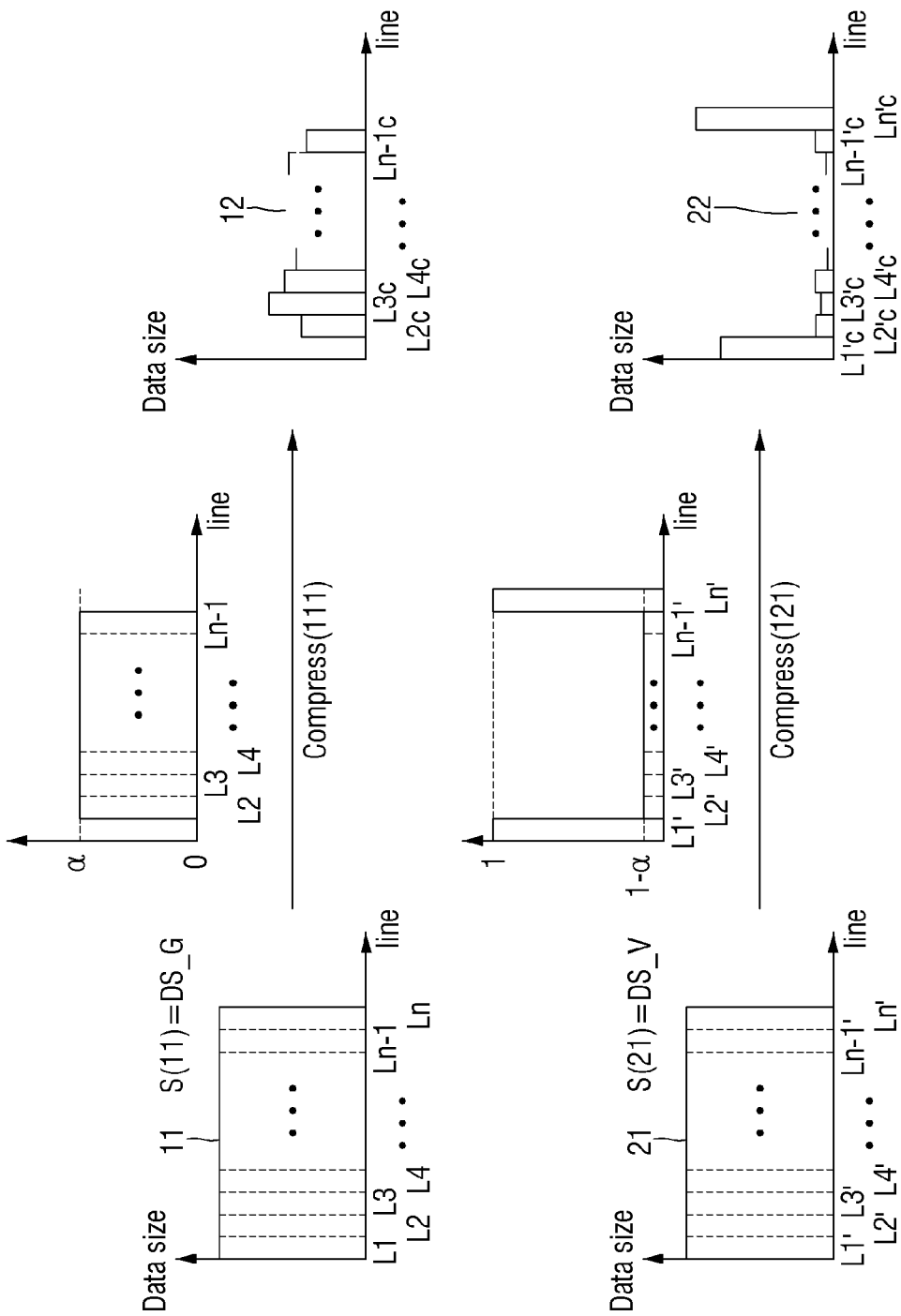
FIGS. 14 and 15 are views illustrating an effect of an image processing system according to some embodiments of the present disclosure.
Figure 15:
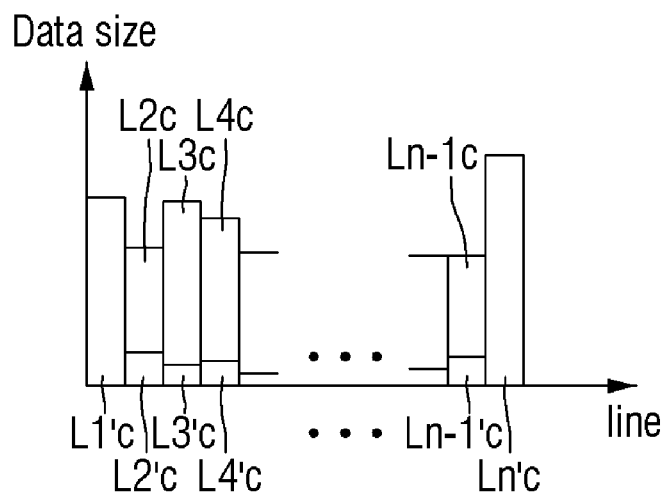

FIGS. 14 and 15 are views illustrating an effect of an image processing system according to some embodiments of the present disclosure.

Referring to FIGS. 14 and 15, the graphic image data 11 includes first to nth graphic image data L1 to Ln, and a total data size of the first to nth graphic image data L1 to Ln is DSG. The video image data 21 includes first to nth video image data L1' to Ln', and the total data size of the first to nth video image data L1 to Ln is DSV.

The first to nth graphic image data L1 to Ln are compressed by the graphic encoder 111 and compressed as the first to nth graphic compressed data L1c to Lnc. The first to nth video image data L1' to Ln' are compressed by the video encoder 121 and compressed as the first to nth video compressed data L1'c to Ln'c.

By the operation of the graphic encoder 111, the video encoder 121 and the alpha map scaler 130, the total data size of the first to nth graphic compressed data L1c to Lnc and the first to nth video compressed data L1'c to Ln'c may be smaller than the DS_G or DSV.

Through the operation of the graphic encoder 111, the video encoder 121 and the alpha map scaler 130, the access amount of the graphic image data and the video image data input to the memory 300 may be reduced.

Figure 16:
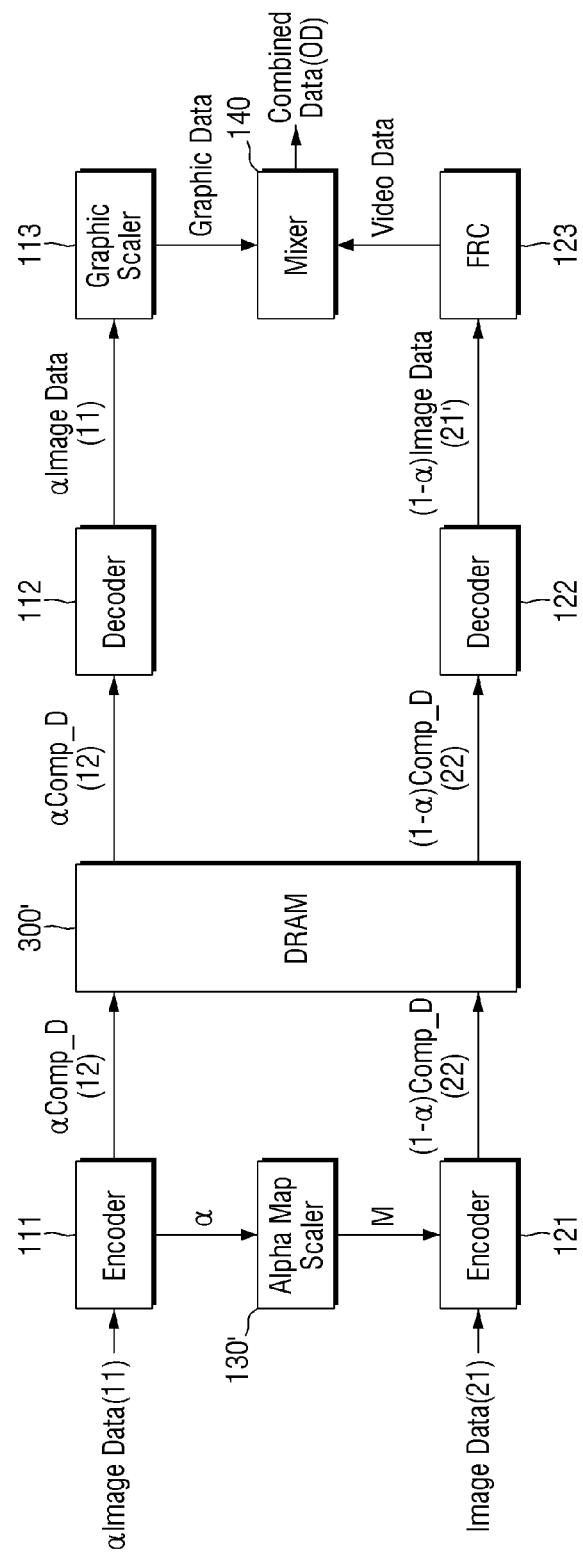
FIG. 16 is a view illustrating an operation of an image processing system according to some embodiments of the present disclosure.

FIG. 16 is a view illustrating an operation of an image processing system according to some embodiments of the present disclosure. Hereinafter, an operation of an image processing system according to some embodiments of the present disclosure will be described with reference to FIG. 16. The operation of the image processing system shown in FIG. 16 will be described based on the difference from the operation of the image processing system shown in FIG. 10.

The alpha map scaler 130 receives the graphic image data 11 from the graphic encoder 111, and extracts the alpha value α from the graphic image data 11 (S110).

The alpha map scaler 130 extracts the alpha value α based on the graphic image data 11 corresponding to the second to (n-1)th graphic image data of FIG. 11.

An alpha map M corresponding to the overlap area X1Y1 of the video image data 21 of FIG. 11 is generated based on the extracted alpha value α.

Figure 17:
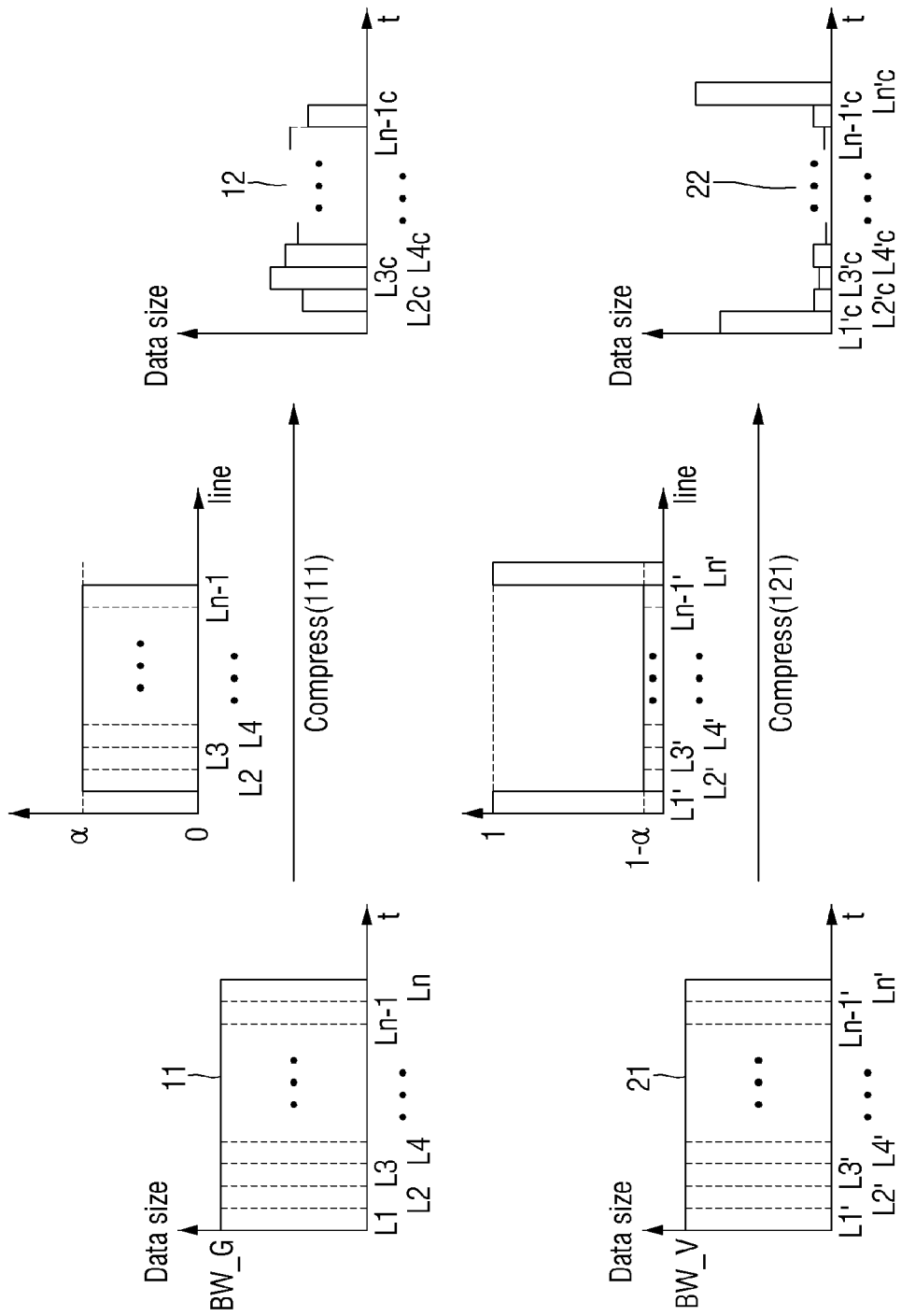
FIGS. 17 and 18 are views illustrating an effect of an image processing system according to some embodiments of the present disclosure.
Figure 18:
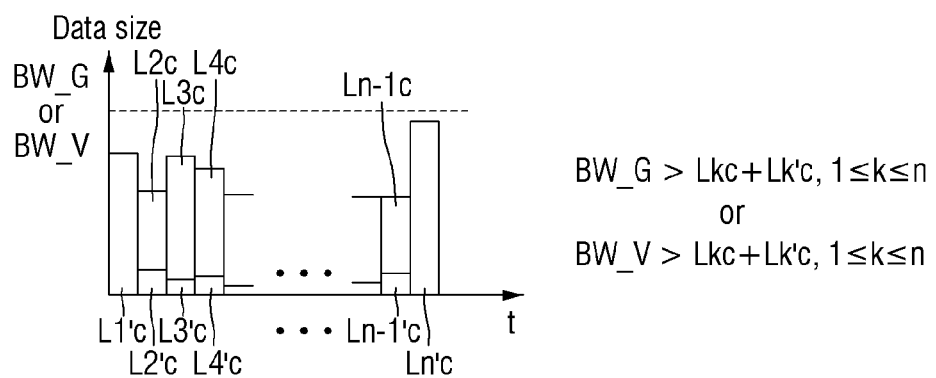

FIGS. 17 and 18 are views illustrating an effect of an image processing system according to some embodiments of the present disclosure.

Referring to FIGS. 17 and 18, the graphic image data 11 includes first to nth graphic image data L1 to Ln, and a data size of each of the first to nth graphic image data L1 to Ln is BW_G. The video image data 21 includes first to nth video image data L1' to Ln', and a data size of each of the first to nth video image data L1 to Ln is BW_V.

The first to nth graphic image data L1 to Ln are compressed by the graphic encoder 111 and compressed as the first to nth graphic compressed data L1c to Lnc, and the first to nth video image data L1' to Ln' are compressed by the video encoder 121 and compressed as the first to nth video compressed data L1'c to Ln' c.

By the operation of the graphic encoder 111, the video encoder 121 and the alpha map scaler 130, each of the first to nth graphic compressed data L1c to Lnc and each of the first to nth video image data L1' to Ln' according to some embodiments may be input to the memory 300 at the same time.

Therefore, a sum of data sizes of kth graphic compressed data Lkc and the kth video compressed data Lk'c, which are input to the memory 300 at the same time, may be smaller than BW_G or BW_V, wherein k ranges from 1 to n.

Through the operation of the graphic encoder 111, the video encoder 121 and the alpha map scaler 130, the access amount of the graphic image data and the video image data, which are input to the memory 300, per hour, i.e., bandwidth, may be reduced.

In the image processing system of the present disclosure, after computation is performed through the alpha map M, compression is performed to reduce a maximum value of a difference in image data size between pixels, whereby the number of bits allocated to compressed data of each pixel may be reduced to increase a compression rate. As a result, the access amount of the graphic image data and the video image data, which are input to the memory 300, may be reduced.

The image processing system of the present disclosure may improve power efficiency used for a compression operation by reducing the difference in image data size between adjacent pixels by compression performed after performing computation through the alpha map M.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image signal processor comprising:
   a first encoder configured to receive first image data for pixel data in a graphic image and perform compression on the first image data to generate first compressed data;
   an alpha map scaler configured to extract an alpha value α of the graphic image from the first image data and generate an alpha map for the alpha value α; and
   a second encoder connected to a memory and configured to:
      receive the alpha map and second image data for pixel data in a video image,
      perform computation on the second image data using the alpha map to generate multiply data,
      perform compression on the multiply data to generate second compressed data, and
      store the second compressed data in the memory.

2. The image signal processor of claim 1, further comprising:
   a mixer configured to perform alpha-bending by mixing the first compressed data and the second compressed data.

3. The image signal processor of claim 1,
   wherein the alpha map includes 1 and a value of (1−the alpha value α).

4. The image signal processor of claim 1,
   wherein the alpha map scaler receives the first image data from the first encoder, and extracts the alpha value α from the first image data received from the first encoder.

5. The image signal processor of claim 1,
   wherein the alpha map scaler receives the first compressed data from the outside, and extracts the alpha value α from the first compressed data.

6. The image signal processor of claim 1,
   wherein the first image data includes (1_1)th image data and (1_2)th image data, which are different from each other,
   wherein the second image data includes (2_1)th image data corresponding to the (1_1)th image data and (2_2)th image data corresponding to the (1_2)th image data,
   wherein the (1_1)th image data are computed using the alpha value α and the (1_2)th image data are computed using 0, and
   wherein the (2_1)th image data are computed using a value of (1−the alpha value α) and the (2_2)th image data are computed using 1.

7. The image signal processor of claim 6,
   wherein the alpha map scaler is configured to generate the alpha map having the value of (1−the alpha value α) to correspond to the (2_1)th image data and 1 to correspond to the (2_2)th image data.

8. The image signal processor of claim 1,
   wherein the alpha value α ranges from 0 to 1.

9. The image signal processor of claim 8,
   wherein the alpha value α is represented using 8 bits.

10. An image processing system comprising:
an image signal processor configured to process first image data for pixel data in a graphic image and second image data for pixel data in a video image to generate an output image;
a memory configured to receive first compressed data for the first image data, second compressed data for the second image data, and the output image; and
a display configured to display the output image,
wherein the image signal processor includes:
a first encoder configured to receive the first image data and perform compression on the first image data to generate the first compressed data;
an alpha map scaler configured to extract an alpha value α of the graphic image from the first image data and generate an alpha map for the alpha value α; and
a second encoder connected to the memory and configured to:
  receive the alpha map and the second image data;
  perform computation on the second image data using the alpha map to generate multiply data;
  perform compression on the multiply data to generate second compressed data; and
  store the second compressed data in the memory.

11. The image processing system of claim 10,
wherein the image signal processor further includes a mixer configured to perform alpha-bending by mixing the first compressed data and the second compressed data.

12. The image processing system of claim 10,
wherein the alpha map scaler is configured to receive the first image data from the first encoder, and extracts the alpha value α from the first image data received from the first encoder.

13. The image processing system of claim 12,
wherein the first image data includes (1_1)th image data and (1_2)th image data, which are different from each other,
wherein the second image data includes (2_1)th image data corresponding to the (1_1)th image data and (2_2)th image data corresponding to the (1_2)th image data,
wherein the (1_1)th image data are computed using the alpha value α and compressed as (1_1)th compressed data in the first compressed data, and the (1_2)th image data are computed using 0 and compressed as (1_2)th compressed data in the first compressed data,
wherein the (2_1)th image data are computed using a value (1−the alpha value α) and compressed as (2_1)th compressed data in the second compressed data, and the (2_2)th image data is computed with 1 and compressed as (2_2)th compressed data in the second compressed data, and
wherein the (1_1)th compressed data and (2_1)th compressed data are provided to the memory at the same time.

14. The image processing system of claim 10,
wherein the alpha map scaler is configured to receive the first compressed data from the memory, and extract the alpha value α from the first compressed data.

15. The image processing system of claim 10,
wherein the alpha map includes 1 and a value of (1−the alpha value α).

16. A method of operating an image signal processor, the method comprising:
receiving first image data for pixel data in a graphic image;
extracting an alpha value α of the graphic image from the first image data and generating an alpha map for the alpha value α;
receiving the alpha map and second image data for pixel data in a video image;
performing computation on the second image data using the alpha map to generate multiply data;
performing compression on the multiply data to generate second compressed data and performing compression on the first image data to generate first compressed data; and
performing alpha-bending by mixing the first compressed data and the second compressed data; and
storing the second compressed data in a memory.

17. The method of claim 16,
wherein the first image data includes (1_1)th image data and (1_2)th image data, which are different from each other,
wherein the second image data includes (2_1)th image data corresponding to the (1_1)th image data and (2_2)th image data corresponding to the (1_2)th image data,
wherein the (1_1)th image data are computed using the alpha value α and compressed as (1_1)th compressed data in the first compressed data, and the (1_2)th image data are computed using 0 and compressed as (1_2)th compressed data in the first compressed data,
wherein the (2_1)th image data are computed using a value (1−the alpha value α) and compressed as (2_1)th compressed data in the second compressed data, and the (2_2)th image data is computed with 1 and compressed as (2_2)th compressed data in the second compressed data, and
wherein the (1_1)th compressed data and the (2_1)th compressed data are output at the same time.

18. The method of claim 16,
wherein the alpha map includes 1 and a value of (1−the alpha value α).

19. The method of claim 16,
wherein the alpha value α ranges from 0 to 1.

20. The method of claim 19,
wherein the alpha value α is represented with 8 bits.

* * * * *